United States Patent
Higashino et al.

(10) Patent No.: US 6,933,652 B2
(45) Date of Patent: Aug. 23, 2005

(54) AUTOMOTIVE ALTERNATOR

(75) Inventors: Kyoko Higashino, Tokyo (JP); Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/726,607

(22) Filed: Dec. 4, 2003

(65) Prior Publication Data

US 2004/0108784 A1 Jun. 10, 2004

(30) Foreign Application Priority Data

Dec. 6, 2002 (JP) ........................................ 2002-355085

(51) Int. Cl.$^7$ ................................................ H02K 3/46
(52) U.S. Cl. ........................ 310/260; 310/201; 310/208
(58) Field of Search .............................. 310/260, 201, 310/208, 43, 45

(56) References Cited

U.S. PATENT DOCUMENTS

| | | | |
|---|---|---|---|
| 6,147,432 A | * 11/2000 | Kusase et al. | 310/260 |
| 6,191,508 B1 | * 2/2001 | Aoki et al. | 310/45 |
| 6,333,573 B1 | * 12/2001 | Nakamura | 310/45 |
| 6,462,453 B1 | * 10/2002 | Asao et al. | 310/179 |
| 6,486,586 B2 | * 11/2002 | Higashino et al. | 310/263 |
| 6,628,023 B1 | * 9/2003 | Paquet | 310/71 |

FOREIGN PATENT DOCUMENTS

| | | | |
|---|---|---|---|
| JP | 2000-209802 A | | 7/2000 |
| JP | 2001-245454 A | | 9/2001 |
| JP | 2001-245454 | * | 9/2001 |

* cited by examiner

*Primary Examiner*—Dang Le
(74) *Attorney, Agent, or Firm*—Sughrue Mion, PLLC

(57) ABSTRACT

A stator winding is configured into a polyphase alternating-current winding by joining together end portions of a plurality of winding sub-portions in a vicinity of each of axial ends of coil end groups within a predetermined circumferential range. Covers are fitted onto each of ancillary connection portions constituted by joint portions between the end portions of the plurality of winding sub-portions so as to closely fit onto an inner circumferential surface, an axial end surface, and an outer circumferential surface of each of the ancillary connection portions, the covers each being filled with a first electrically-insulating resin.

7 Claims, 10 Drawing Sheets

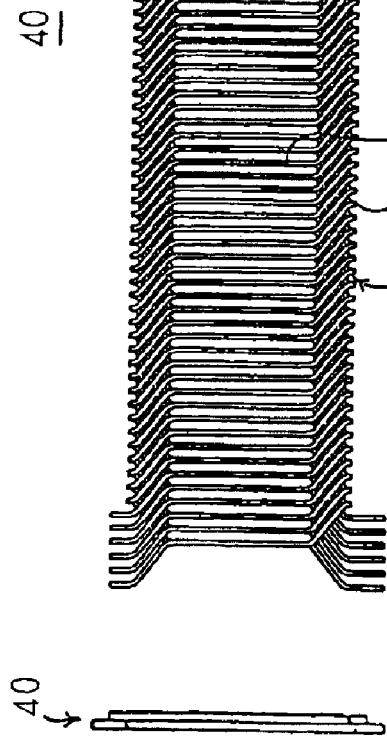
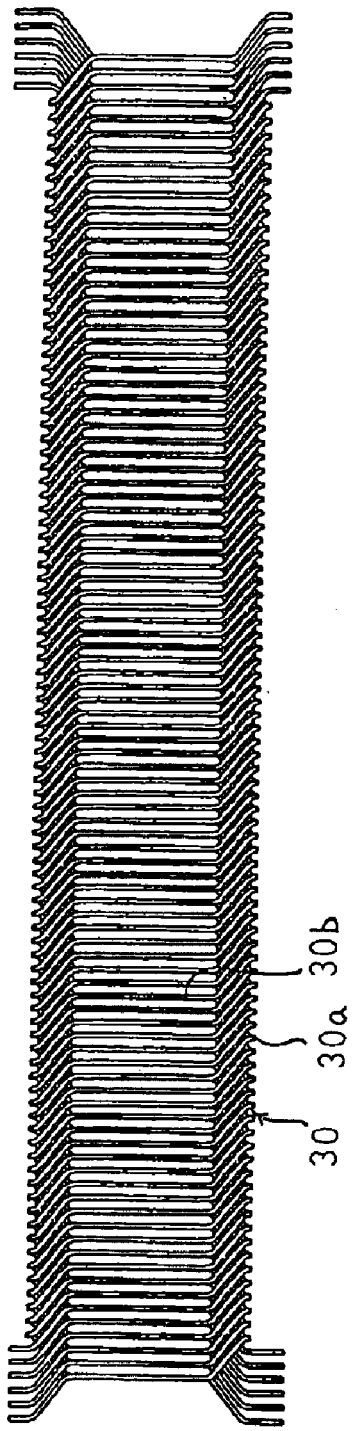

AUTOMOTIVE ALTERNATOR

BACKGROUND OF THE INVENTION

1. Field of the Invention

The present invention relates to an automotive alternator and particularly to a stator construction enabling heat dissipation of heat generated in stator winding joint portions to be improved and deterioration in application workability and quality of an electrically-insulating resin to be suppressed.

2. Description of the Related Art

In a first conventional stator for an automotive alternator, a plurality of continuous conductor wires are each wound for one round into a wave winding in slots separated by a predetermined number of slots so as to alternately occupy an inner layer and an outer layer in a slot depth direction, winding phase portions being constructed by joining together end portions of the continuous conductor wires installed in identical slot groups. Portions of each of the continuous conductor wires exiting the slots and entering slots a predetermined number of slots away, in other words coil ends, are arranged so as to be aligned in rows in a circumferential direction so as to line up two rows deep in a radial direction, constituting coil end groups. In addition, annular shielding plates each having an L-shaped cross section are disposed so as to cover an inner circumferential side and an apex portion of each of the coil end groups, and an epoxy resin is applied to the coil end groups so as to embed the shielding plates. At this time, the epoxy resin is interposed between the shielding plates and the coil ends so as to have a predetermined thickness. (See Patent Literature 1, for example.)

Here, in joint portions, an electrically-insulating coating covering the end portions of the continuous conductor wires is removed, leaving the metal base material of the conductor wires in an exposed state. Thus, in order to suppress short-circuiting between the joint portions, galvanic corrosion of the joint portions, etc., it is necessary to electrically insulate the joint portions. However, in this first conventional stator for an automotive alternator, no mention is made of electrically-insulating treatments for the joint portions. Thus, in the first conventional stator for an automotive alternator, the shielding plates are disposed so as to cover the apex portions of the coil end groups, including the joint portions, and if the epoxy resin is applied to the coil end groups and the joint portions, the resin is interposed so as to have a predetermined thickness not only between the shielding plates and the coil ends, but also between the shielding plates and the joint portions. Electrical resistance is greater in these joint portions than in other portions of the continuous conductor wires, increasing the amount of heat generated. As a result, the heat generated cannot dissipate effectively, not only in the coil ends, but also in the joint portions where the amount of heat generated is the greatest. In addition, the epoxy resin also serves to secure the shielding plates and the coil ends (including the joint portions) but there is no means for positioning the shielding plates and the shielding plates move easily as the epoxy resin is being applied, leading to deterioration in the application and quality of the electrically-insulating resin.

In a second conventional stator for an automotive alternator, a stator winding is constructed by inserting U-shaped conductor segments into pairs of slots in a stator core from a first end and joining together free ends of the conductor segments projecting outward at a second end of the stator core. Joint portions are arranged so as to form two rows in a circumferential direction and to line up in single columns in a radial direction, constituting a coil end group. In addition, a cap having a double-row construction which has an annular shape and is provided with two chambers is placed over the coil end group such that each row of the joint portions arranged so as to form two rows in a circumferential direction is housed in each of the chambers, each of the chambers being filled with an electrically-insulating resin to electrically insulate the joint portions. (See Patent Literature 2, for example.)

However, in the second conventional stator for an automotive alternator, because the widths of the chambers of the cap are formed so as to be wider than the radial lengths of the joint portions, the injected electrically-insulating resin is thick and excessive around outer edge portions of each of the joint portions, preventing the heat generated in the joint portions from dissipating efficiently. The electrically-insulating resin also serves to secure the cap and the joint portions, but the cap is not positioned in a reliably secured state and moves easily, particularly in a radial direction radially outside or radially inside the range of the coil ends, making both workability and quality poor. Contact between the cap and internal components of the alternator is also of concern.

Patent Literature 1: Japanese Patent Laid-Open No. 2001-245454 (Gazette: FIG. 14)

Patent Literature 2: Japanese Patent Laid-Open No. 2000-209802 (Gazette: FIG. 5)

In these conventional stators for an automotive alternator, because the electrically-insulating resin is interposed thickly between the shielding plates (or the cap) and the joint portions, one problem has been that the heat generated in the joint portions is prevented from dissipating efficiently, causing the temperature of the stator winding to rise excessively and preventing high output from being achieved. Another problem has been that positioning of the shielding plates (or the cap) is insufficient, reducing workability and quality. Thus, there has been a risk that contact may occur with the internal components of the alternator if the shielding plates or the cap is misaligned.

SUMMARY OF THE INVENTION

The present invention aims to solve the above problems and an object of the present invention is to provide an automotive alternator provided with a stator enabling heat dissipation of heat generated in joint portions to be improved and enabling deterioration in the application and quality of an electrically-insulating resin to be suppressed by fitting a cover onto an ancillary connection portion composed of joint portions between end portions of a plurality of winding sub-portions constituting a stator winding so as to be placed in close contact with external surfaces of the ancillary connection portions and electrically insulating the joint portions by filling the cover with an electrically-insulating resin to reduce interposition of the electrically-insulating resin between the cover and the joint portions and to reliably secure the cover during mounting.

According to one aspect of the present invention, an automotive alternator includes a stator winding having a plurality of winding sub-portions each formed by installing a strand of wire in slots at intervals of a predetermined number of slots so as to alternately occupy an inner layer and an outer layer in a slot depth direction, the winding sub-portions each being formed into a wave-shaped pattern in which straight portions housed in pairs of the slots separated by the predetermined number of slots are linked near axial end surfaces of a stator core by return portions, and coil end groups each being constructed by arranging the return portions in a circumferential direction near axial end surfaces of the stator core, respectively. The stator winding is configured into a polyphase alternating-current winding by joining together end portions of the plurality of winding sub-portions in a vicinity of each of axial ends of the coil end groups within a predetermined circumferential range. Covers are fitted onto each of ancillary connection portions constituted by joint portions between the end portions of the plurality of winding sub-portions so as to closely fit onto an inner circumferential surface, an axial end surface, and an outer circumferential surface of each of the ancillary connection portions, respectively, the covers each being filled with a first electrically-insulating resin.

Therefore, heat dissipation of heat generated in the joint portions can be improved, and deterioration in the application workability and quality of the electrically-insulating resin can be suppressed.

BRIEF DESCRIPTION OF THE DRAWINGS

FIG. 8A is an end elevation explaining a winding assembly constituting part of the stator winding of the stator of the automotive alternator according to Embodiment 1 of the present invention;

FIG. 8B is a plan explaining the winding assembly constituting part of the stator winding of the stator of the automotive alternator according to Embodiment 1 of the present invention;

DETAILED DESCRIPTION OF THE PREFERRED EMBODIMENTS

Preferred embodiments of the present invention will now be explained with reference to the drawings.

Embodiment 1

Figure 1:
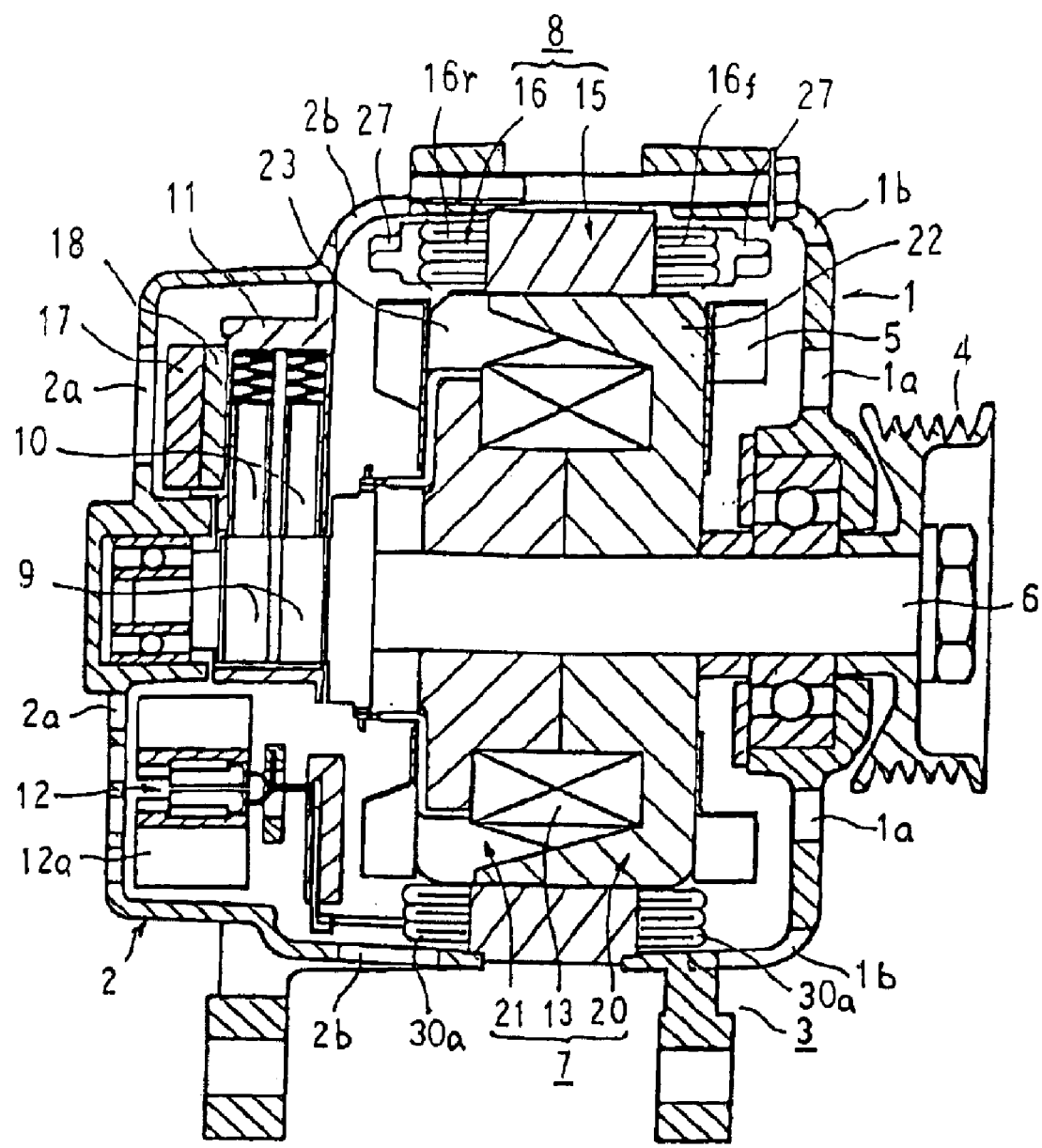
FIG. 1 is a longitudinal section showing an automotive alternator according to Embodiment 1 of the present invention.
Figure 2:
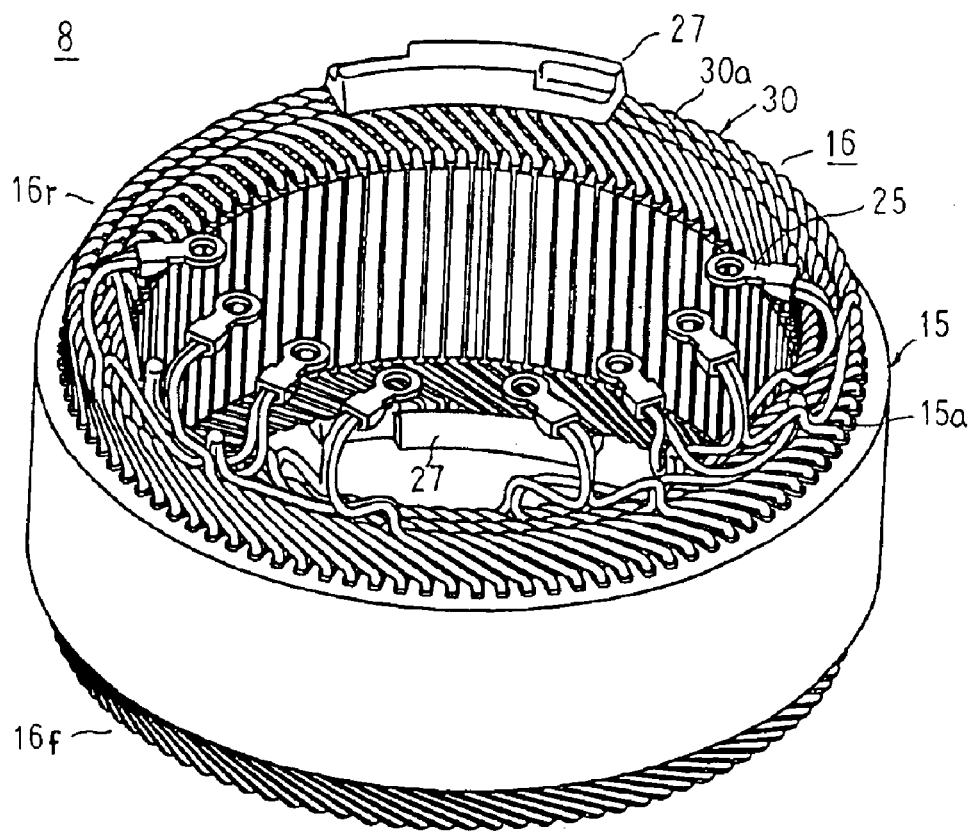
FIG. 2 is a perspective of a stator used in the automotive alternator according to Embodiment 1 of the present invention viewed from a rear end.
Figure 3:
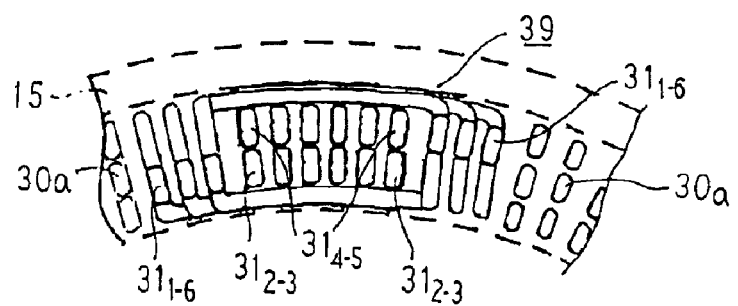
FIG. 3 is a partial rear-end end elevation of a vicinity of an ancillary connection portion of the stator used in the automotive alternator according to Embodiment 1 of the present invention before mounting a cover.
Figure 4:
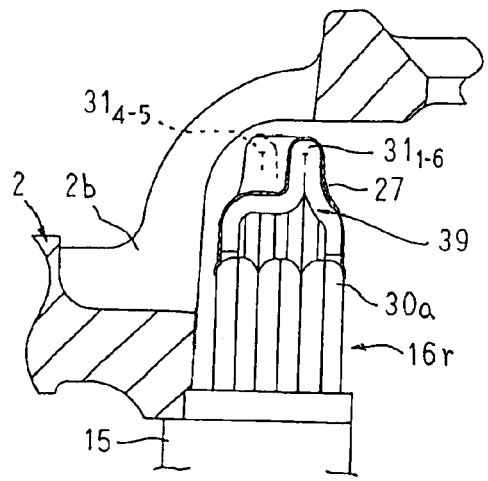
FIG. 4 is a partial cross section showing the vicinity of the ancillary connection portion of the stator of the automotive alternator according to Embodiment 1 of the present invention before applying an electrically-insulating resin.
Figure 5:
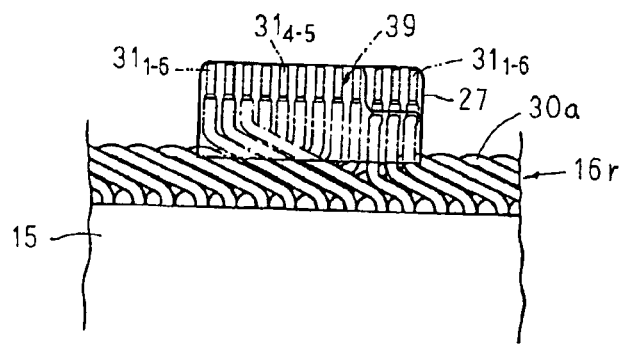
FIG. 5 is a partial side elevation of the vicinity of the ancillary connection portion of the stator used in the automotive alternator according to Embodiment 1 of the present invention with the cover mounted, viewed from radially outside.
Figure 6:
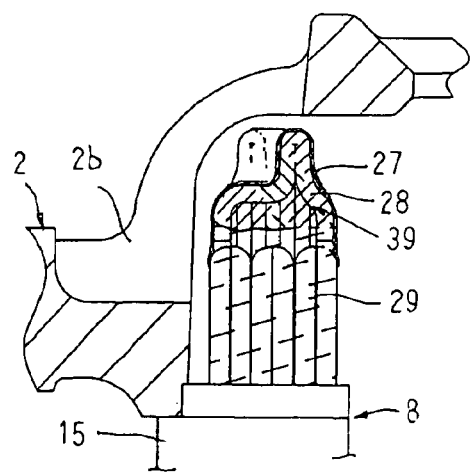
FIG. 6 is a partial cross section showing the vicinity of the ancillary connection portion of the stator of the automotive alternator according to Embodiment 1 of the present invention.
Figure 7:
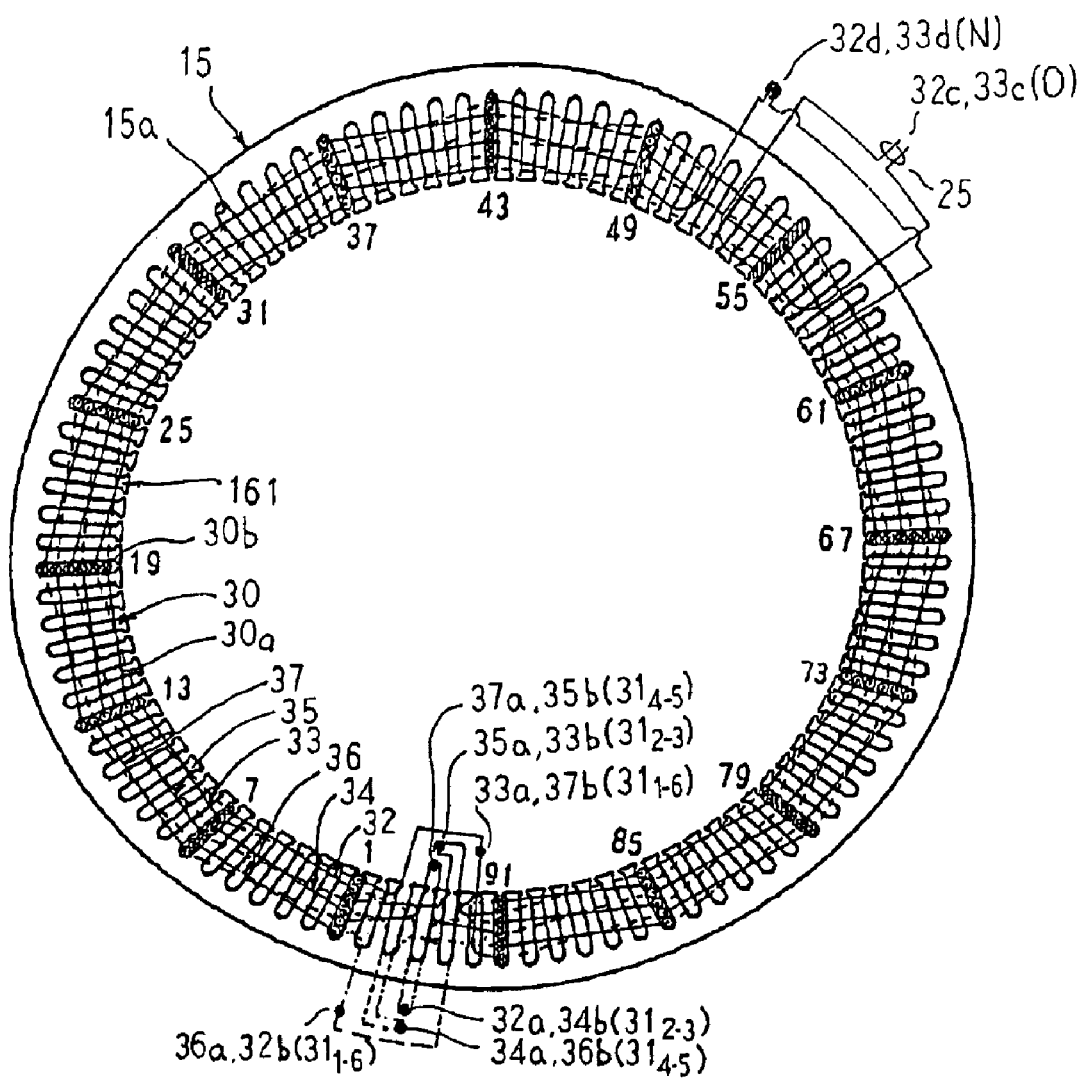
FIG. 7 is a rear-end end elevation schematically showing a first single-phase winding phase portion of a stator winding in the stator of the automotive alternator according to Embodiment 1 of the present invention.
Figure 9:
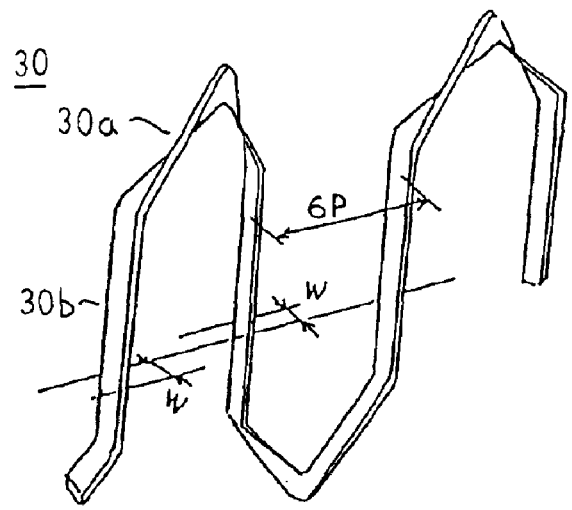
FIG. 9 is a perspective showing a continuous conductor wire constituting part of the winding assembly shown in FIG. 8.
Figure 10:
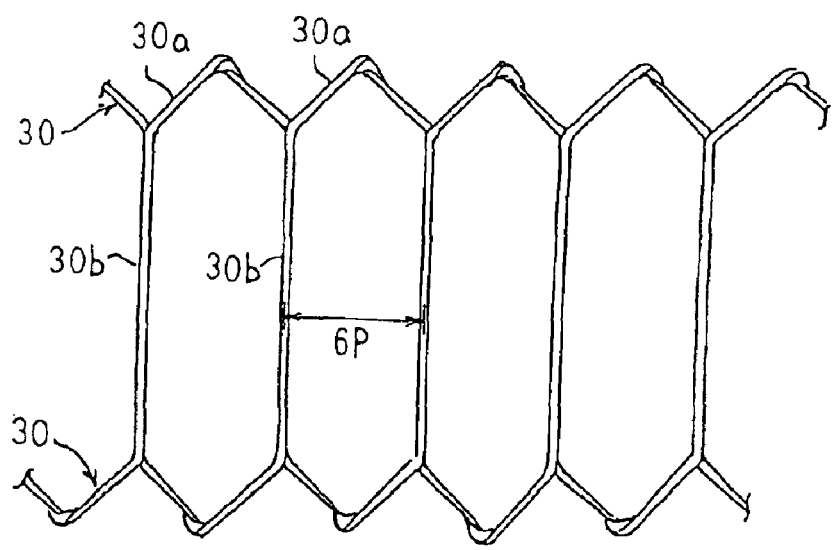
FIG. 10 is a partial perspective showing a pair of continuous conductor wires constituting part of the winding assembly shown in FIG. 8.

FIG. 1 is a longitudinal section showing an automotive alternator according to Embodiment 1 of the present invention, FIG. 2 is a perspective of a stator used in the automotive alternator according to Embodiment 1 of the present invention viewed from a rear end, FIG. 3 is a partial rear-end end elevation of a vicinity of an ancillary connection portion of the stator used in the automotive alternator according to Embodiment 1 of the present invention before mounting a cover, FIG. 4 is a partial cross section showing the vicinity of the ancillary connection portion of the stator of the automotive alternator according to Embodiment 1 of the present invention before application of an electrically-insulating resin, FIG. 5 is a partial side elevation of the vicinity of the ancillary connection portion of the stator used in the automotive alternator according to Embodiment 1 of the present invention with the cover mounted, viewed from radially outside, and FIG. 6 is a partial cross section showing the vicinity of the ancillary connection portion of the stator of the automotive alternator according to Embodiment 1 of the present invention. FIG. 7 is a rear-end end elevation schematically showing a first single-phase winding phase portion of a stator winding in the stator of the automotive alternator according to Embodiment 1 of the present invention, solid lines in the figure indicating rear-end wiring, broken lines indicating front-end wiring, and black circles indicating joint portions. FIG. 8A and FIG. 8B are an end elevation and a plan, respectively, explaining a winding assembly constituting part of the stator winding of the stator of the automotive alternator according to Embodiment 1 of the present invention. FIG. 9 is a partial perspective showing a continuous conductor wire constituting part of the winding assembly shown in FIG. 8, and FIG. 10 is a partial perspective showing a pair of continuous conductor wires constituting part of the winding assembly shown in FIG. 8.

In FIG. 1, an automotive alternator is provided with: a case 3 constituted by a front bracket 1 and a rear bracket 2 made of aluminum; a shaft 6 disposed inside the case 3, a pulley 4 secured to a first end portion of the shaft 6; a Lundell-type rotor 7 secured to the shaft 6; fans 5 functioning as a cooling means secured to first and second axial end portions of the rotor 7; a stator 8 secured to the case 3 so as to envelop the rotor 7; slip rings 9 secured to a second end portion of the shaft 6 for supplying an electric current to the rotor 7; a pair of brushes 10 sliding on surfaces of the slip rings 9; a brush holder 11 for housing the brushes 10; rectifiers 12 electrically connected to the stator 8 for converting an alternating current generated in the stator 8 into a direct current; and a regulator 18 mounted to a heat sink 17 fitted onto the brush holder 11, the regulator 18 adjusting the magnitude of an alternating voltage generated in the stator 8.

The rotor 7 includes: a field winding 13 for generating a magnetic flux on passage of an electric current; and a pair of first and second pole cores 20 and 21 disposed so as to cover the field winding 13, magnetic poles being formed in the first and second pole cores 20 and 21 by the magnetic flux from the field winding. The first and second pole cores 20 and 21 are made of iron, having four first and four second claw-shaped magnetic poles 22 and 23, respectively, each of the claw-shaped magnetic poles 22 and 23 having a generally trapezoidal outermost diameter surface shape disposed on an outer circumferential edge portion at a uniform angular pitch in a circumferential direction so as to project axially, and the first and second pole cores 20 and 21 being fixed to the shaft 6 facing each other such that the first and second claw-shaped magnetic poles 22 and 23 intermesh.

The stator 8 is constituted by: a cylindrical stator core 15; and a stator winding 16 installed in the stator core 15. The stator 8 is held between the front bracket 1 and the rear bracket 2 so as to form a uniform air gap between an inner circumferential surface of the stator core 15 and outer circumferential surfaces of the claw-shaped magnetic poles 22 and 23.

In the automotive alternator constructed in this manner, an electric current is supplied to the field winding 13 from a battery (not shown) by means of the brushes 10 and the slip rings 9, generating a magnetic flux. The first claw-shaped magnetic poles 22 in the first pole core 20 are magnetized into North-seeking (N) poles by this magnetic flux, and the second claw-shaped magnetic poles 23 in the second pole core 21 are magnetized into South-seeking (S) poles. At the same time, rotational torque from an engine is transmitted to the shaft 6 by means of a belt (not shown) and the pulley 4, rotating the rotor 7. Thus, a rotating magnetic field is imparted to the stator winding 16, generating an electromotive force in the stator winding 16. This alternating-current electromotive force passes through the rectifiers 12 and is converted into a direct current, and the magnitude thereof is adjusted by the regulator 18, charging the battery.

At the rear end, external air is drawn in due to rotation of the fans 5 through rear-end air intake apertures 2a disposed opposite heat sinks on the rectifiers 12 and the heat sink 17 of the regulator 18, etc., flows along the axis of the shaft 6, cooling the rectifiers 12 and the regulator 18, is then deflected centrifugally by the fans 5, cooling a rear-end coil end group 16r of the stator winding 16, and is discharged outside through rear-end air discharge apertures 2b. At the same time, at the front end, external air is drawn in axially through front-end air intake apertures 1a due to rotation of the fans 5, is then deflected centrifugally by the fans 5, cooling a front-end coil end group 16f of the stator winding 16, and is discharged outside through front-end air discharge apertures 1b.

Next, a configuration of the stator 8 will be explained with reference to FIGS. 2 to 10. Here, in the stator core 15, slots 15a having grooves lying in an axial direction are formed at a ratio of two slots per phase per pole. In other words, ninety-six slots 15a are arranged circumferentially on an inner circumferential side of the stator core 15, the number of magnetic poles in the rotor 7 being sixteen. The stator winding 16 is constructed by installing in the stator core 15 continuous conductor wires 30 functioning as strands of wire. These continuous conductor wires 30 are formed by coating an electrically-insulating coating onto a continuous copper wire having a rectangular cross section. In addition, to facilitate explanation, Slot Numbers from 1 to 96 are allocated to each of the slots 15a as shown in FIG. 7, and the positions in each of the slots 15a in which the conductor segments 30 are housed are designated Address 1, Address 2, etc., through Address 6, respectively, from an inner circumferential side.

First, a specific construction of the stator winding 16 will be explained.

A first single-phase winding phase portion 161, as shown in FIG. 7, is constituted by first to sixth winding sub-portions 32 to 37 each composed of one continuous conductor wire 30.

The first winding sub-portion 32 is constructed by wave winding one continuous conductor wire 30 into every sixth slot from Slot Numbers 1 to 91 so as to alternately occupy Address 2 and Address 1 in the slots 15a. The second winding sub-portion 33 is constructed by wave winding a continuous conductor wire 30 into every sixth slot from Slot Numbers 1 to 91 so as to alternately occupy Address 1 and Address 2 in the slots 15a. The third winding sub-portion 34 is constructed by wave winding a continuous conductor wire 30 into every sixth slot from Slot Numbers 1 to 91 so as to alternately occupy Address 4 and Address 3 in the slots 15a. The fourth winding sub-portion 35 is constructed by wave winding a continuous conductor wire 30 into every sixth slot from Slot Numbers 1 to 91 so as to alternately occupy Address 3 and Address 4 in the slots 15a. The fifth winding sub-portion 36 is constructed by wave winding a continuous conductor wire 30 into every sixth slot from Slot Numbers 1 to 91 so as to alternately occupy Address 6 and Address 5 in the slots 15a. The sixth winding sub-portion 37 is constructed by wave winding a continuous conductor wire 30 into every sixth slot from Slot Numbers 1 to 91 so as to alternately occupy Address 5 and Address 6 in the slots 15a. In each of the slots 15a, straight portions 30b (slot-housed portions) of the six continuous conductor wires 30 are arranged so as to line up in one column in a radial direction (a slot depth direction) with longitudinal axes of their rectangular cross sections aligned radially.

At the rear end of the stator core 15, a first end portion 33a of the second winding sub-portion 33 extending outward from Address 1 of Slot Number 1 and a second end portion 37b of the sixth winding sub-portion 37 extending outward from Address 6 of Slot Number 91 are joined, a first end portion 35a of the fourth winding sub-portion 35 extending outward from Address 3 of Slot Number 1 and a second end portion 33b of the second winding sub-portion 33 extending outward from. Address 2 of Slot Number 91 are joined, and a first end portion 37a of the sixth winding sub-portion 37 extending outward from Address 5 of Slot Number 1 and a second end portion 35b of the fourth winding sub-portion 35 extending outward from Address 4 of Slot Number 91 are joined to form a three-turn wave winding in which the second, fourth, and sixth winding sub-portions 33, 35, and 37 are connected in series. Moreover, a first near-address joint portion $31_{2-3}$ constituting a joint portion between the first end portion 35a of the fourth winding sub-portion 35 and the second end portion 33b of the second winding sub-portion 33 and a second near-address joint portion $31_{4-5}$ constituting a joint portion between the first end portion 37a of the sixth winding sub-portion 37 and the second end portion 35b of the fourth winding sub-portion 35 are lined up in one column in a radial direction so as to be separated from each other at the same axial height.

Here, a first end portion region of the continuous conductor wire 30 constituting the second winding sub-portion 33 extends outward from Address 1 of slot 15a Number 1, bends and extends for a predetermined distance in a counterclockwise direction in FIG. 7 above a rear-end end surface of the stator core 15, then bends axially outward, next bends radially outward, and finally bends axially outward. A second end portion region of the continuous conductor wire 30 constituting the sixth winding sub-portion 37 extends outward from Address 6 of slot 15a Number 91, bends and extends for a predetermined distance in a clockwise direction in FIG. 7 above the rear-end end surface of the stator core 15, then bends axially outward, next bends radially inward, and finally bends axially outward. The first end portion 33a of the continuous conductor wire 30 constituting the second winding sub-portion 33 and the second end portion 37b of the continuous conductor wire 30 constituting the sixth winding sub-portion 37 are joined. Thus, a distant-address joint portion $31_{1-6}$ constituting a joint portion between the first end portion 33a of the second winding sub-portion 33 and the second end portion 37b of the sixth winding sub-portion 37 is arranged so as to be offset by three slots in a counterclockwise direction in FIG. 7 at the same axial height as the first and second near-address joint portions $31_{2-3}$ and $31_{4-5}$ which line up in a radial direction.

At the front end of the stator core 15, a first end portion 32a of the first winding sub-portion 32 extending outward from Address 2 of Slot Number 1 and a second end portion 34b of the third winding sub-portion 34 extending outward from Address 3 of Slot Number 91 are joined, a first end portion 34a of the third winding sub-portion 34 extending outward from Address 4 of Slot Number 1 and a second end portion 36b of the fifth winding sub-portion 36 extending outward from Address 5 of Slot Number 91 are joined, and a first end portion 36a of the fifth winding sub-portion 36 extending outward from Address 6 of Slot Number 1 and a second end portion 32b of the first winding sub-portion 32 extending outward from Address 1 of Slot Number 91 are joined to form a three-turn wave winding in which the first, third, and fifth winding sub-portions 32, 34, and 36 are connected in series. Moreover, a first near-address joint portion $31_{2-3}$ constituting a joint portion between the first end portion 32a of the first winding sub-portion 32 and the second end portion 34b of the third winding sub-portion 34 and a second near-address joint portion $31_{4-5}$ constituting a joint portion between the first end portion 34a of the third winding sub-portion 34 and the second end portion 36b of the fifth winding sub-portion 36 are lined up in one column in a radial direction so as to be separated from each other at the same axial height.

Here, a first end portion region of the continuous conductor wire 30 constituting the fifth winding sub-portion 36 extends outward from Address 6 of slot 15a Number 1, bends and extends for a predetermined distance in a counterclockwise direction in FIG. 7 above a front-end end surface of the stator core 15, then bends axially outward, next bends radially inward, and finally bends axially outward. A second end portion region of the continuous conductor wire 30 constituting the first winding sub-portion 32 extends outward from Address 1 of slot 15a Number 91, bends and extends for a predetermined distance in a clockwise direction in FIG. 7 above a front-end end surface of the stator core 15, then bends axially outward, next bends radially outward, and finally bends axially outward. The first end portion 36a of the continuous conductor wire 30 constituting the fifth winding sub-portion 36 and the second end portion 32a of the continuous conductor wire 30 constituting the first winding sub-portion 32 are joined. Thus, the distant-address joint portion $31_{1-6}$ constituting a joint portion between the first end portion 36a of the fifth winding sub-portion 36 and the second end portion 32b of the first winding sub-portion 32 is arranged so as to be offset by three slots in a clockwise direction in FIG. 7 at the same axial height as the first and second near-address joint portions $31_{2-3}$ and $31_{4-5}$ which line up in a radial direction.

A portion of the continuous wire 30 of the first winding sub-portion 32 projecting outward at the rear end of the stator core 15 from Slot Numbers 49 and 55 is cut, and a portion of the continuous wire 30 of the second winding sub-portion 33 projecting outward at the rear end of the stator core 15 from Slot Numbers 55 and 61 is cut. Then, the three-turn first single-phase winding phase portion 161 is formed such that the first, third, and fifth winding sub-portions 32, 34, and 36 connected in series and the second, fourth, and sixth winding sub-portions 33, 35, and 37 connected in series are connected in parallel by connecting a first cut end 32c of the first winding sub-portion 32 and a first cut end 33c of the second winding sub-portion 33 to metal connection fitting 25 and joining together a second cut end 32d of the first winding sub-portion 32 and a second cut end 33d of the second winding sub-portion 33.

Moreover, the first cut end 32c of the first winding sub-portion 32 and the first cut end 33c of the second winding sub-portion 33 become an output wire (O) of the first single-phase winding phase portion 161, and the second cut end 32d of the first winding sub-portion 32 and the second cut end 33d of the second winding sub-portion 33 become a neutral point leader wire (N) of the first single-phase winding phase portion 161.

Moreover, only the first single-phase winding phase portion 161, which is installed in a first slot group including Slot Numbers 1, 7, etc., through 91, is shown in FIG. 7, but second to sixth single-phase winding phase portions 161 are similarly installed in a second slot group including Slot Numbers 2, 8, etc., through 92, a third slot group including Slot Numbers 3, 9, etc., through 93, a fourth slot group including Slot Numbers 4, 10, etc., through 94, a fifth slot group including Slot Numbers 5, 11, etc., through 95, and a sixth slot group including Slot Numbers 6, 12, etc., through 96, respectively. The distant-address joint portions $31_{1-6}$ of the fourth to sixth slot groups are arranged at the rear end so as to be offset by three slots in a clockwise direction in FIG. 7 at the same axial height as the first and second adjacent-address joint portions $31_{2-3}$ and $31_{4-5}$ which line up in a radial direction, and distant-address joint portions $31_{1-6}$ are arranged at the front end so as to be offset by three slots in a counterclockwise direction in FIG. 7 at the same axial height as the first and second adjacent-address joint portions $31_{2-3}$ and $31_{4-5}$ which line up in a radial direction.

At the rear end of a stator winding 16 constructed in this manner, the return portions 30a of the continuous conductor wires 30 extending outward from the slots 15a and entering slots 15a six slots away are arranged at a pitch of one slot in a circumferential direction so as to form three rows in an annular shape, constituting a rear-end coil end group 16r. A rear-end ancillary connection portion 39, as shown in FIG. 3, is constructed by arranging six pairs of first and second near-address joint portions $31_{2-3}$ and $31_{4-5}$ lined up in single columns radially at a pitch of one slot in a circumferential direction above the return portions 30a of the rear-end coil end group 16r, and arranging groups of three distant-address joint portions $31_{1-6}$ at a pitch of one slot at first and second circumferential ends of the six pairs of first and second near-address joint portions $31_{2-3}$ and $31_{4-5}$.

Similarly, at the front end of a stator winding 16 constructed in this manner, the return portions 30a of the continuous conductor wires 30 extending outward from the slots 15a and entering slots 15a six slots away are arranged at a pitch of one slot in a circumferential direction so as to form three rows in an annular shape, constituting a front-end coil end group 16f. A front-end ancillary connection portion 39, as shown in FIG. 3, is constructed by arranging six pairs of first and second near-address joint portions $31_{2-3}$ and $31_{4-5}$ lined up in single columns radially at a pitch of one slot in a circumferential direction above the return portions 30a of the front-end coil end group 16f, and arranging groups of three distant-address joint portions $31_{1-6}$ at a pitch of one slot at first and second circumferential ends of the six pairs of first and second near-address joint portions $31_{2-3}$ and $31_{4-5}$.

A cover 27 is fitted over the rear-end ancillary connection portion 39, as shown in FIGS. 4 and 5. In addition, as shown in FIG. 6, a silicone resin 28 functioning as a first electrically-insulating resin is injected inside the cover 27, and then a varnish 29 functioning as a second electrically-insulating resin is applied to the rear-end coil end group 16r. Similarly, a cover 27 is fitted over the front-end ancillary connection portion 39, the silicone resin 28 is injected inside the cover 27, and then the varnish 29 is applied to the front-end coil end group 16f.

Here, the covers 27 are formed by molding a glass-reinforced epoxy resin so as to have internal surface shapes which closely contact the external surfaces of the ancillary connection portions 39. Thus, the covers 27 are fitted onto the inner circumferential surfaces, the outer circumferential surfaces, and the axial end surfaces of the ancillary connection portions 39 in a generally closely-fitted state.

A first three-phase alternating-current winding is prepared by connecting together each of the neutral-point leader wires (N) of the first, third, and fifth single-phase winding phase portions 161 installed in the first slot group, the third slot group, and the fifth slot group, respectively, to form the first, third, and fifth single-phase winding phase portions 161 into a Y connection (an alternating-current connection). Similarly, a second three-phase alternating-current winding is prepared by connecting together each of the neutral-point leader wires (N) of the second, fourth, and sixth single-phase winding phase portions 161 installed in the second slot group, the fourth slot group, and the sixth slot group, respectively, to form the second, fourth, and sixth single-phase winding phase portions 161 into a Y connection (an alternating-current connection). Finally, the stator 8 shown in FIG. 2 is prepared by connecting a metal connection fitting 25 to each of the neutral-point leader wires (N).

In the stator 8 constructed in this manner, each of the continuous conductor wires 30 constituting the first to sixth winding sub-portions 32 to 37 is installed in a wave winding so as to extend outward from any given slot 15a at an end surface of the stator core 15, fold over, and enter a slot 15a six slots away. Each of the continuous conductor wires 30 is installed in every sixth slot so as to alternately occupy an inner layer and an outer layer in a slot depth direction (a radial direction).

As shown in FIG. 1, this stator 8 is mounted to an automotive alternator so as to be held between a front bracket 1 and a rear bracket 2 such that a uniform air gap is formed between outer circumferential surfaces of the first and second claw-shaped magnetic poles 22 and 23 and an inner circumferential surface of the stator core 15. The neutral-point leader wires (N) and the output wires (O) of the first and second three-phase alternating current windings constituting the stator winding 16 are connected to separate rectifiers 12 such that the direct-current outputs from each of the rectifiers 12 are connected in parallel and combined.

Next, a winding assembly 40 constituting part of the stator winding 16 will be explained with reference to FIGS. 8 to 10.

The winding assembly 40 is formed by simultaneously folding twelve continuous conductor wires 30 (strands of wire) arranged parallel to each other on a plane at a pitch of one slot.

As shown in FIG. 9, each of the continuous conductor wires 30 is shaped by bending into a planar pattern in which straight portions 30b linked by return portions 30a are arranged at a pitch of six slots (6P). Adjacent pairs of the straight portions 30b are offset by the return portions 30a by a width (w) of the continuous conductor wires 30 in a direction perpendicular to the direction of disposal of the straight portions 30b. Pairs of continuous conductor wires 30 are formed such that continuous conductor wires 30 shaped by bending in this manner are arranged so as to be offset by a pitch of six slots with straight portions 30b stacked (as shown in FIG. 10), the winding assembly 40 being constructed such that six of these pairs are arranged so as to be offset by a pitch of one slot from each other.

In this winding assembly 40, as shown in FIG. 8, ninety-six pairs of straight portions 30b are arranged at a pitch of one slot, and six end portions of the continuous conductor wires 30 extend outward on first and second sides at first and second ends of the winding assembly 40. The end portions of the continuous conductor wires 30 extending outward on the first and second sides at the first and second ends of the winding assembly 40 correspond to the end portions 32a to 37a and 32b to 37b of the first to sixth winding sub-portions 32 to 37 in FIG. 7.

Although not shown, a rectangular parallelepiped laminated core is prepared by laminating a large number of strip-shaped bodies each composed of a magnetic steel sheet in which slots are formed at a predetermined pitch and integrating the strip-shaped bodies by laser welding, for example. Next, three winding assemblies 40 are mounted to the rectangular parallelepiped laminated core so as to be stacked in a slot depth direction. Here, six straight portions 30b are housed in each of the slots of the laminated core so as to line up in single columns with the longitudinal axes of the rectangular cross sections thereof aligned in the slot depth direction. Then, an annular stator core 15 is prepared by rolling up the laminated core, abutting the end portions of the laminated core, and joining them integrally by laser welding, for example.

Thereafter, the electrically-insulating coating on the end portions of the continuous conductor wires 30 is removed to expose the copper wire, the connection process shown in FIG. 7 is applied, and the covers 27 are fitted onto each of the ancillary connection portions 39. Next, the stator 8 shown in FIG. 2 is prepared by injecting the silicone resin 28 inside the covers 27, and finally, applying the varnish 29 to the first and second coil end groups 16f and 16r.

Thus, according to Embodiment 1, because the covers 27 are fitted onto the ancillary connection portions 39 of the stator winding 16 and the silicone resin 28 is injected inside the covers 27, the joint portions between the continuous conductor wires 30 in the ancillary connection portions 39 are isolated from exterior portions electrically and spatially, reliably suppressing short-circuiting between the joint portions, galvanic corrosion of the joint portions, etc.

Because the covers 27 are formed so as to have internal surface shapes which closely contact the external surfaces of the ancillary connection portions 39, the covers 27 are fitted onto the inner circumferential surfaces, the outer circumferential surfaces, and the axial end surfaces of the ancillary connection portions 39 in a generally closely-fitted state. Thus, because the portions of the continuous conductor wires 30 positioned on the inner circumferential side, the outer circumferential side, and the axial ends of the ancillary connection portions 39 and inner wall surfaces of the covers 27 are in a general state of close contact with the amount of interposed silicone resin 28 greatly reduced, heat generated in the joint portions is transferred swiftly to the covers 27 to be dissipated from the outer surfaces of the covers 27 to the cooling airflow generated by the fans 5. As a result, heat dissipation of the heat generated in the joint portions is improved, suppressing excessive temperature increases in the stator winding 16 that otherwise give rise to deterioration in output characteristics. In addition, because the covers 27 are fitted onto the ancillary connection portions 39 tightly, workability when applying the silicone resin 28 and the varnish 29 is increased, and the occurrence of protrusion, etc., of the silicone resin 28 or the varnish 29 is suppressed, enabling quality to be increased. Furthermore, misalignment of the covers 27 does not occur during the operation of applying the silicone resin 28 or the varnish 29, thereby suppressing contact with the case 3, internal components of the alternator, etc.

Because the silicone resin 28 is injected inside the covers 27, the electrically-insulating resin embedding the joint portions is less likely to degrade due to heat, and cracking due to heat deformation is also eliminated, reliably suppressing short-circuiting between the joint portions, galvanic corrosion of the joint portions, etc.

Because the varnish 29 is applied to the front-end and rear-end coil end groups 16f and 16r, the return portions 30a constituting the front-end and rear-end coil end group 16f and 16r are linked by the varnish 29, increasing the resistance of the front-end and rear-end coil end groups 16f and 16r to vibration. Thus, the occurrence of insulation failure resulting from contact between the return portions 30a, and the occurrence of wire breakages in the return portions 30a, etc., are suppressed.

Because the covers 27 are prepared using a glass-reinforced epoxy resin, the heat tolerance of the covers 27 is increased, enabling suppression of heat deformation of the covers 27 resulting from heat generated in the joint portions of the ancillary connection portions 39.

Embodiment 2

Figure 11:
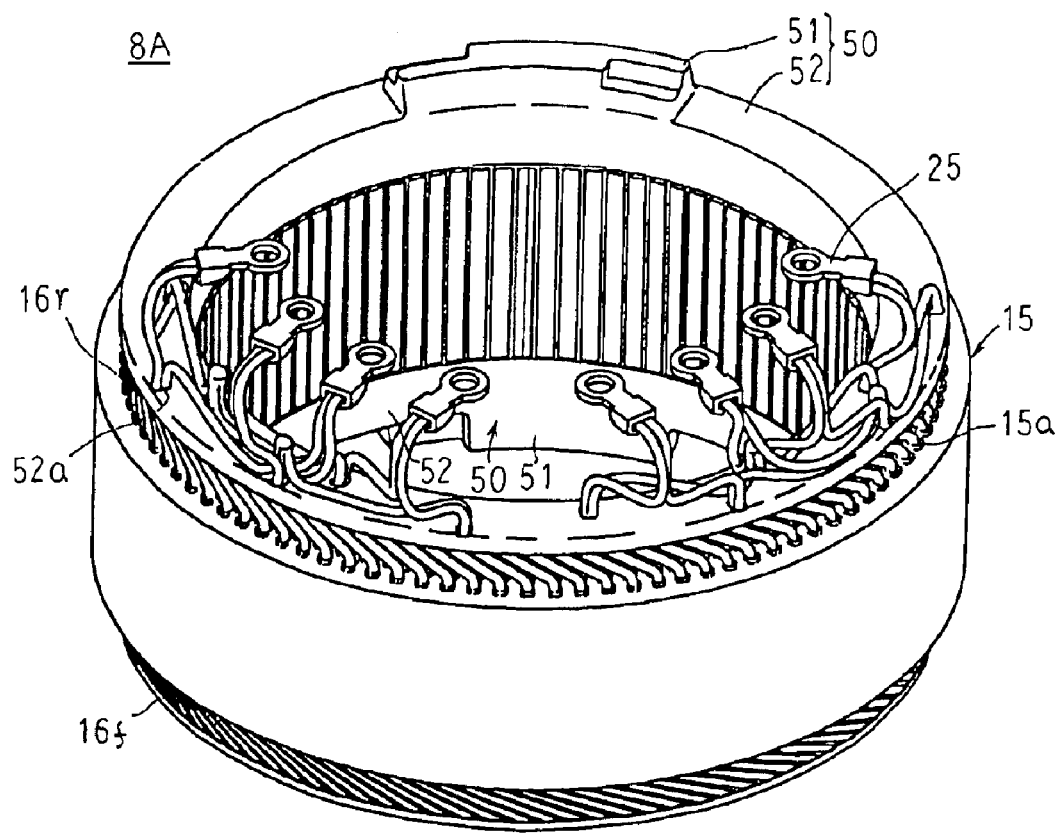
FIG. 11 is a partial perspective of a stator used in an automotive alternator according to Embodiment 2 of the present invention viewed from a rear end.
Figure 12:
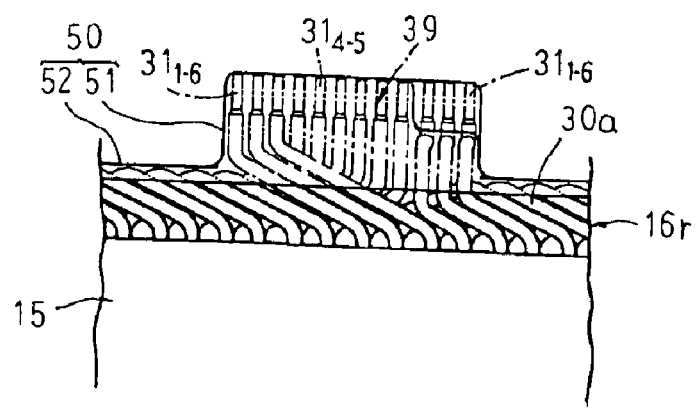
FIG. 12 is a partial side elevation of a vicinity of an ancillary connection portion of the stator used in the automotive alternator according to Embodiment 2 of the present invention with the cover mounted, viewed from radially outside.
Figure 13:
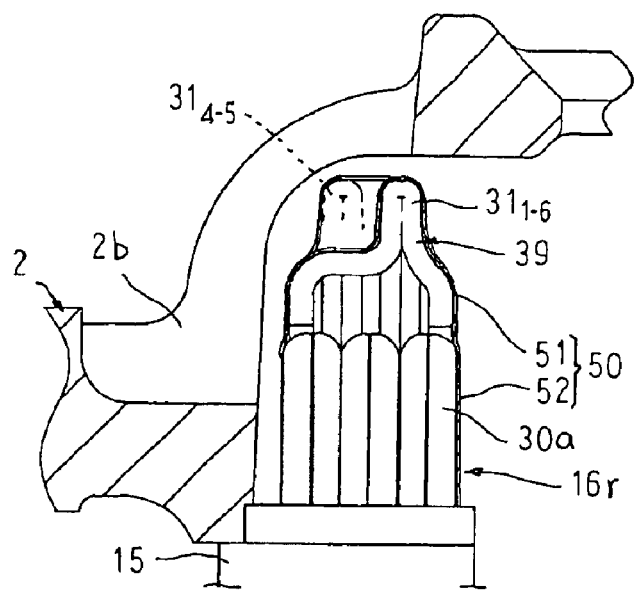
FIG. 13 is a partial cross section showing the vicinity of the ancillary connection portion of the stator of the automotive alternator according to Embodiment 2 of the present invention before applying an electrically-insulating resin.
Figure 14:
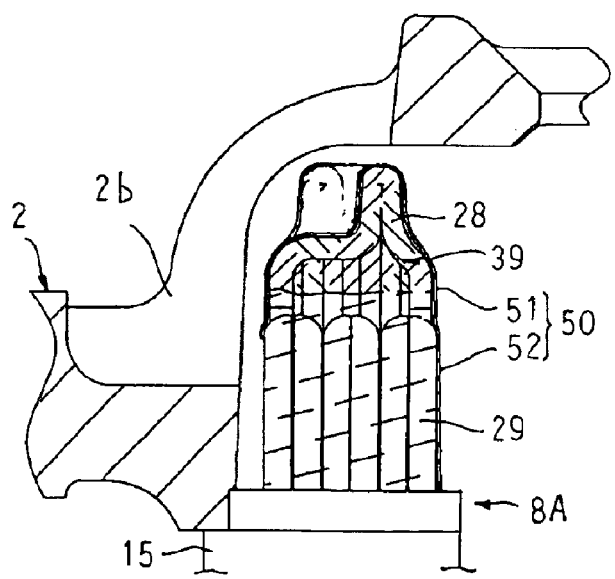
FIG. 14 is a partial cross section showing the vicinity of the ancillary connection portion of the stator of the automotive alternator according to Embodiment 2 of the present invention.
Figure 15:
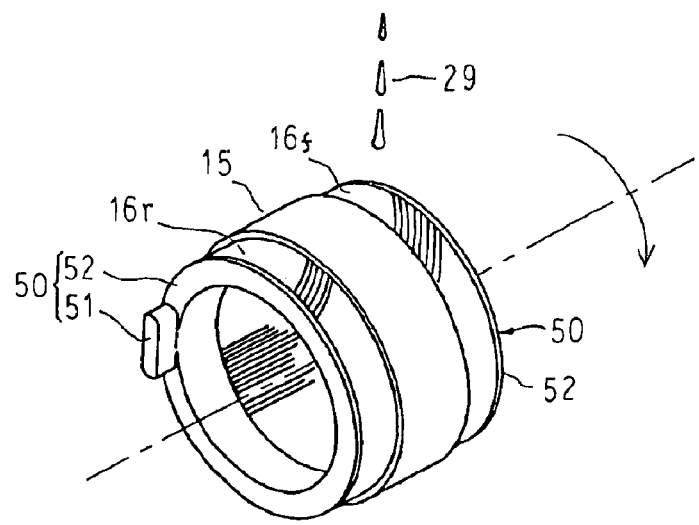
FIG. 15 is a perspective explaining a method for applying a varnish to the stator for an automotive alternator according to Embodiment 2 of the present invention.

FIG. 11 is a partial perspective of a stator used in an automotive alternator according to Embodiment 2 of the present invention viewed from a rear end, FIG. 12 is a partial side elevation of a vicinity of an ancillary connection portion of the stator used in the automotive alternator according to Embodiment 2 of the present invention with the cover mounted, viewed from radially outside, FIG. 13 is a partial cross section showing the vicinity of the ancillary connection portion of the stator of the automotive alternator according to Embodiment 2 of the present invention before application of an electrically-insulating resin, FIG. 14 is a partial cross section showing the vicinity of the ancillary connection portion of the stator of the automotive alternator according to Embodiment 2 of the present invention, and FIG. 15 is a perspective explaining a method for applying a varnish in the stator for an automotive alternator according to Embodiment 2 of the present invention.

In FIGS. 11 to 14, covers 50 are each constructed integrally using a glass-reinforced epoxy resin into a cap portion 51 fitting onto a rear-end (and a front-end) ancillary connection portion 39; and an annular portion 52 mounted to a rear-end coil end group 16r (and a front-end coil end group 16f). The cap portion 51 is constructed so as to have an identical shape to the covers 27 according to Embodiment 1 above. The annular portion 52 is constructed into an annular body having a J-shaped cross section extending axially outward from a rear-end end surface (and a front-end end surface) of the stator core 15 over an inner circumferential surface of the rear-end coil end group 16r (and the front-end coil end group 16f), and extending radially outward in an arc shape over an axial end surface of the rear-end coil end group 16r (and the front-end coil end group 16f).

Moreover, Embodiment 2 is constructed in a similar manner to Embodiment 1 above except that these covers 50 are used instead of those covers 27.

In Embodiment 2, the end portions of the first to sixth winding sub-portions 32 to 37 are joined together at the rear end and the front end, based on the method for connecting of the stator winding 16 shown in FIG. 7, then the covers 50 are mounted such that the cap portions 51 are fitted onto each of the ancillary connection portions 39, and the annular portion 52 is placed over the rear-end coil end group 16r (and the front-end coil end group 16f). Here, the output wires (O) and the neutral-point leader wires (N) are led out through apertures 52a disposed through the annular portion 52. Then, connection of the output wires (O) and the neutral-point leader wires (N) is performed.

Thereafter, the entire circumferences of the inner circumferential edges of the annular portions 52 are fixed to the rear-end end surface and the front-end end surface of the stator core 15 using an adhesive, for example. Thus, the cap portions 51, as shown in FIG. 13, are fitted onto the inner circumferential surfaces, the outer circumferential surfaces, and the axial end surfaces of the ancillary connection portions 39 in a generally closely-fitted state. The annular portions 52 are also mounted to the inner circumferential surfaces and the axial end surfaces of the rear-end coil end group 16r and the front-end coil end group 16f in a generally closely-fitted state.

Next, a silicone resin 28 is injected inside the cap portions 51. As shown in FIG. 15, a varnish 29 is applied to the rear-end and front-end coil end groups 16r and 16f by dripping the varnish 29 onto the rear-end and front-end coil end groups 16r and 16f from radially outside while rotating the stator core 15 with its central axis held horizontally or inclined at a predetermined angle. Thus, the stator 8A shown in FIG. 11 is obtained. Moreover, as shown in FIG. 14, the cap portions 51 are filled with the silicone resin 28, and the rear-end and front-end coil end groups 16r and 16f are impregnated with the varnish 29.

According to Embodiment 2, because the covers 50 are provided with cap portions 51 equivalent to the covers 27 in Embodiment 1 above, similar effects to those in Embodiment 1 above are achieved.

Because the annular portions 52 of the covers 50 are mounted to the inner circumferential surfaces and the axial end surfaces of the rear-end coil end group 16r and the front-end coil end group 16f in a generally closely-fitted state, the amount of varnish 29 interposed between inner wall surfaces of the annular portions 52 and the return portions 30a constituting the rear-end coil end group 16r and the front-end coil end group 16f can be greatly reduced. As a result, heat generated in the return portions 30a is swiftly transferred to the annular portions 52 of the covers 50 to be dissipated from the outer surfaces of the annular portions 52 to the cooling airflow generated by the fans 5. Consequently, deterioration in heat dissipation resulting from mounting the annular portions 52 is suppressed.

Because the cap portions 51 are fitted onto the inner circumferential surfaces, the outer circumferential surfaces, and the axial end surfaces of the ancillary connection portions 39 in a generally closely-fitted state and the inner circumferential edges of the annular portions 52 are fixed to the end surfaces of the stator core 15, workability when applying the silicone resin 28 and the varnish 29 is improved and misalignment of the covers 50 is also prevented.

Because the annular portions 52 are formed with a J-shaped cross section, the varnish 29 can be applied from the exposed outer circumferential surface sides of the rear-end and front-end coil end groups 16r and 16f, facilitating application of the varnish 29. In addition, because the entire circumferences of the inner circumferential edges of the annular portions 52 are fixed to the end surfaces of the stator core 15, a suitable amount of the varnish 29 also penetrates inside the slots 15a without leaking out radially inside the stator core 15. Thus, the stator core 15 and the stator winding 16 are sufficiently fixed to each other to improve the vibration resistance of the rear-end and front-end coil end groups 16r and 16f.

Because the annular portions 52 are mounted so as to follow the inner circumferential sides and the axial ends of the rear-end and front-end coil end groups 16r and 16f, the cooling airflow generated by the fans 5 flows over the annular portions 52, thereby enabling ventilation resistance to be reduced and suppressing the occurrence of interference noise resulting from circumferential irregularities on the inner circumferential surfaces of the rear-end and front-end coil end groups 16r and 16f.

Embodiment 3

Figure 16:
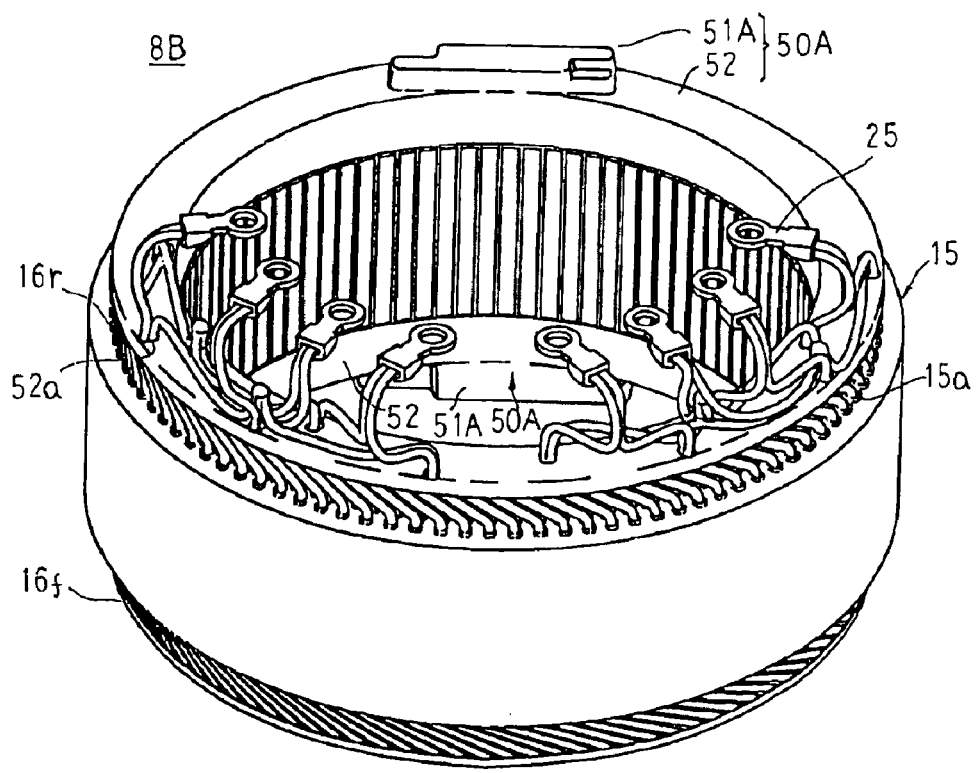
FIG. 16 is a perspective of a stator used in an automotive alternator according to Embodiment 3 of the present invention viewed from a rear end.
Figure 17:
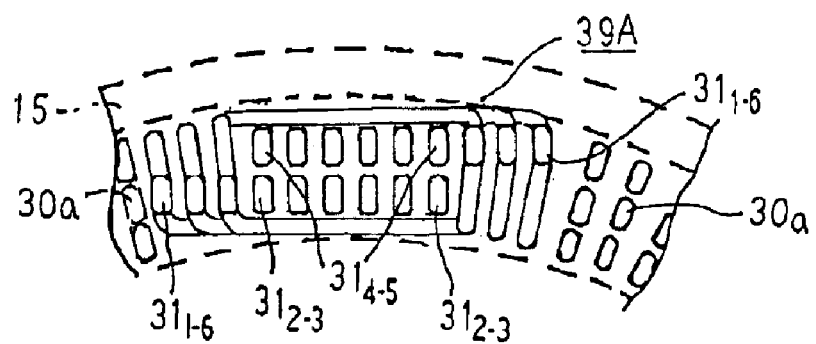
FIG. 17 is a partial rear-end end elevation of a vicinity of an ancillary connection portion of the stator used in the automotive alternator according to Embodiment 3 of the present invention before mounting a cover.

FIG. 16 is a perspective of a stator used in an automotive alternator according to Embodiment 3 of the present invention viewed from a rear end, and FIG. 17 is a partial rear-end end elevation of a vicinity of an ancillary connection portion of the stator used in the automotive alternator according to Embodiment 3 of the present invention before mounting a cover.

In FIGS. 16 and 17, a rear-end ancillary connection portion 39A is constructed by arranging six second near-address joint portions $31_{4-5}$ and three distant-address joint portions $31_{1-6}$ in a straight line above the return portions 30a of the rear-end coil end group 16r, and arranging six first near-address joint portions $31_{2-3}$ and three distant-address joint portions $31_{1-6}$ in a straight line above the return portions 30a of the rear-end coil end group 16f so as to be radially inside the line of second near-address joint portions $31_{4-5}$ and distant-address joint portions $31_{1-6}$. The ancillary connection portion 39A is formed so as to be inside radial bounds of a rear-end coil end group 16r, in other words, so as not to protrude radially outside or inside the rear-end coil end group 16r.Moreover, a front-end ancillary connection portion 39A is constructed similarly.

Covers 50A are each constructed integrally using a glass-reinforced epoxy resin into a cap portion 51A fitting onto the rear-end (and the front-end) ancillary connection portion 39A; and an annular portion 52 mounted to the rear-end coil end group 16r (and the front-end coil end group 16f). The cap portions 51A are formed so as to have internal surface shapes which closely contact the external surfaces of the ancillary connection portions 39A.

Moreover, the rest of this embodiment is constructed in a similar manner to Embodiment 2 above.

In a stator 8B according to Embodiment 3, because the cap portions 51A of the covers 50A are fitted onto the inner circumferential surfaces, the outer circumferential surfaces, and the axial end surfaces of the ancillary connection portions 39A in a generally closely-fitted state and the annular portions 52 are mounted to the inner circumferential surfaces and the axial end surfaces of the rear-end coil end group 16r and the front-end coil end group 16f in a generally closely-fitted state, similar effects to those in Embodiment 2 above can also be achieved.

Whereas in the ancillary connection portions 39 according to Embodiment 2 above, six second near-address joint portions $31_{4-5}$ and three distant-address joint portions $31_{1-6}$ are arranged in an arc shape and six first near-address joint portions $31_{2-3}$ and three distant-address joint portions $31_{1-6}$ are arranged in an arc shape so as to be radially inside the row constituted by the second near-address joint portions $31_{4-5}$ and the distant-address joint portions $31_{1-6}$, in these ancillary connection portions 39A, six second near-address joint portions $31_{4-5}$ and three distant-address joint portions $31_{1-6}$ are arranged in a straight line and six first near-address joint portions $31_{2-3}$ and three distant-address joint portions $31_{1-6}$ are arranged in a straight line so as to be radially inside the line constituted by the second near-address joint portions $31_{4-5}$ and the distant-address joint portions $31_{1-6}$. Thus, the joints can be welded by moving a welding jig in a straight line, thereby improving the joining workability and enabling cost reductions.

Because these ancillary connection portions 39A are also disposed inside the radial region of the rear-end coil end group 16r (and the front-end coil end group 16f) in a similar manner to the ancillary connection portions 39 according to Embodiment 2 above, the cap portions 51A fitted onto the ancillary connection portions 39A do not protrude radially outside or inside the rear-end coil end group 16r (or the front-end coil end group 16f) or come into contact with the case 3, or internal components of the alternator, etc.

Embodiment 4

Figure 18:
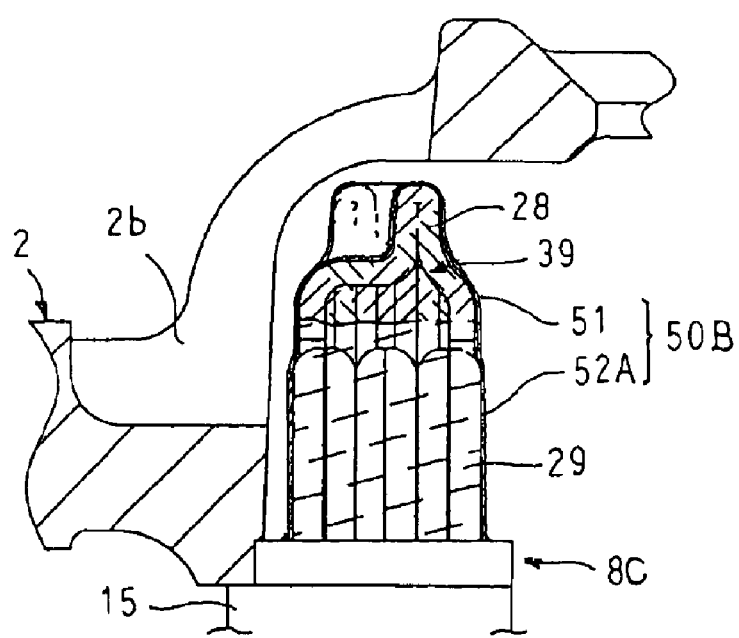
FIG. 18 is a partial cross section showing a vicinity of an ancillary connection portion of a stator of an automotive alternator according to Embodiment 4 of the present invention.

FIG. 18 is a partial cross section showing a vicinity of an ancillary connection portion of a stator of an automotive alternator according to Embodiment 4 of the present invention.

In FIG. 18, covers 50B are each constructed integrally into a cap portion 51 fitting onto the rear-end (and the front-end) ancillary connection portion 39; and an annular portion 52A mounted to the rear-end coil end group 16r (and the front-end coil end group 16f). The annular portion 52A is constructed into an annular body having a U-shaped cross section extending axially outward from a rear-end end surface (and a front-end end surface) of the stator core 15 over an inner circumferential surface of the rear-end coil end group 16r (and the front-end coil end group 16f), extending radially outward in an arc shape over an axial end surface of the rear-end coil end group 16r (and the front-end coil end group 16f), and finally extending axially inward over an outer circumferential surface of the rear-end coil end group 16r (the front-end coil end group 16f) to the rear-end end surface (and the front-end end surface) of the stator core 15.

Moreover, Embodiment 4 is constructed in a similar manner to Embodiment 2 above except that these covers 50B are used instead of those covers 50.

Consequently, similar effects to those in Embodiment 2 above can also be achieved in Embodiment 4.

In a stator 8C according to Embodiment 4, because the annular portions 52A of the covers 50B are disposed so as to cover the external surfaces of the rear-end coil end group 16r and the front-end coil end group 16f, electrical insulation between the rear-end coil end group 16r and the rear bracket 2 and between the front-end coil end group 16f and the front bracket 1 is ensured.

Moreover, in each of the above embodiments, the stator winding 16 is explained as being constructed by connecting the first to sixth winding sub-portions 32 to 37 based on the connection method shown in FIG. 7, but connection of the first to sixth winding sub-portions 32 to 37 is not limited to this method and may be arbitrarily set according to design specifications.

The arrangement of the joint portions in the ancillary connection portions and the arrangement of the ancillary connection portions and the output wires (including the neutral-point leader wires) are not limited to the arrangements in each of the above embodiments. In other words, the ancillary connection portions are formed at the abutted portions when the rectangular parallelepiped laminated core is rolled up, but the output wires (including the neutral-point leader wires) have a degree of design freedom and may be arbitrarily set according to design specifications.

In each of the above embodiments, the winding assemblies 40 are explained as being mounted to the stator core 15 so as to be stacked in three layers in a radial direction, but it goes without saying that the winding assemblies 40 may also be mounted to the stator core 15 so as to be stacked in two layers or four or more layers in a radial direction.

In each of the above embodiments, the covers 27, 50, 50A, and 50B are made of a glass-reinforced epoxy resin, but the material of the covers 27, 50, 50A, and 50B is not limited to the glass-reinforced epoxy-resin provided that it has electrically-insulating properties and heat tolerance and a nylon, for example, is also acceptable.

What is claimed is:

1. An automotive alternator comprising:

a case;

a rotor rotatably disposed inside said case;

a stator comprising:

an annular stator core fixed to said case radially outside said rotor so as to surround said rotor, a large number of slots opening onto an inner circumferential side being formed side by side in a circumferential direction on said stator core; and a stator winding installed in said stator core; and a cooling means for generating an airflow for cooling said stator winding by rotating together with said rotor, wherein said stator winding comprises a plurality of winding sub-portions each formed by installing a strand of wire in said slots at intervals of a predetermined number of slots so as to alternately occupy an inner layer and an outer layer in a slot depth direction, said winding sub-portions each being formed into a wave-shaped pattern in which straight portions housed in pairs of said slots separated by said predetermined number of slots are linked near axial end surfaces of said stator core by return portions, coil end groups each being constructed by arranging said return portions in a circumferential direction near axial ends surface of said stator core, respectively, said stator winding is configured into a polyphase alternating-current winding by joining together end portions of said plurality of winding sub-portions in a vicinity of each of axial ends of said coil end groups within a predetermined circumferential range, and covers are fitted onto each of ancillary connection portions constituted by joint portions between said end-portions of said plurality of winding sub-portions so as to closely fit onto an inner circumferential surface, an axial end surface, and an outer circumferential surface of each of said ancillary connection portions, respectively, said covers each being filled with a first electrically-insulating resin.

2. The automotive alternator according to claim 1, wherein each of said covers has an annular portion covering an inner circumferential surface and an axial end surface of each of said coil end groups, said coil end groups each being impregnated with a second electrically-insulating resin.

3. The automotive alternator according to claim 2, wherein said second electrically-insulating resin is a varnish.

4. The automotive alternator according to claim 1, wherein each of said covers has an annular portion covering an inner circumferential surface, an axial end surface, and an outer circumferential surface of each of said coil end groups, said coil end groups each being impregnated with a second electrically-insulating resin.

5. The automotive alternator according to claim 1, wherein each of said covers is made of a glass-reinforced epoxy resin.

6. The automotive alternator according to claim 1, wherein said first electrically-insulating resin is a silicone resin.

7. The automotive alternator according to claim 1, wherein said joint portions constituting each of said ancillary connection portions are arranged in a straight line so as not to protrude radially outside and inside said coil end groups.

* * * * *